United States Patent [19]

Hayashi

[11] Patent Number: 4,860,863

[45] Date of Patent: Aug. 29, 1989

[54] METHOD AND APPARATUS FOR CONTROLLING A CLUTCH OF A VEHICLE

[75] Inventor: Takashi Hayashi, Susono, Japan

[73] Assignee: Toyota Jidosha Kabushiki Kaisha, Aichi, Japan

[21] Appl. No.: 200,918

[22] Filed: Jun. 1, 1988

[30] Foreign Application Priority Data

Jun. 4, 1987 [JP] Japan ................... 62-140507

[51] Int. Cl.⁴ .................. B60K 41/02; F16D 37/02
[52] U.S. Cl. ........................ 192/0.033; 192/0.076; 192/0.096
[58] Field of Search ............... 192/0.033, 0.076, 0.096

[56] References Cited

U.S. PATENT DOCUMENTS

| | | | |
|---|---|---|---|
| 4,527,678 | 7/1985 | Pierce et al. | 192/3.58 |
| 4,606,446 | 8/1985 | Watanabe | 192/0.076 |
| 4,624,349 | 9/1986 | Watanabe | 192/0.076 |
| 4,638,898 | 1/1987 | Braun | 192/0.076 |
| 4,715,482 | 12/1987 | Watanabe et al. | 192/0.096 |
| 4,723,644 | 2/1988 | Sakakiyama | 192/0.033 |
| 4,730,711 | 3/1988 | Sakakiyama | 192/0.076 |

FOREIGN PATENT DOCUMENTS 57-15024  1/1982  Japan.
58-39821  3/1983  Japan.
62-31532  2/1987  Japan.

*Primary Examiner*—Leslie A. Braun
*Assistant Examiner*—Nicholas Whitelaw
*Attorney, Agent, or Firm*—Oliff & Berridge

[57] ABSTRACT

A clutch control apparatus and method for a vehicle. The apparatus includes two sensors for detecting an engine speed Ne and a speed Nin of a clutch at an input side of a transmission and a controller, respectively. The controller stores in advance a transmission coefficient C (referring to a speed ratio Nin/Ne) of the clutch and determines an output torque of the clutch using the transmission coefficient C and the engine speed Ne.

In the method, an engine speed Ne and an input shaft speed Nin of a transmission are detected, then a speed ratio Nin/Ne is calculated. On the other hand, a transmission coefficient C is determined from a predetermined relation of the transmission coefficient C and the speed ratio Nin/Ne. Finally, the output torque of the clutch is determined using the transmission coefficient C and the engine speed Ne, for instance, by a formula which is $C \cdot (N_e)^2$.

6 Claims, 7 Drawing Sheets

METHOD AND APPARATUS FOR CONTROLLING A CLUTCH OF A VEHICLE

BACKGROUND OF THE INVENTION

1. Field of the Invention

This invention relates to a method and an apparatus for controlling the torque which is transmitted from by a clutch engaged to an engine of a vehicle to a transmission when the vehicle is started from a stop.

2. Discussion of the Related Art

There are known a variety of methods for controlling the torque which is transmitted from a clutch to an engine of a vehicle. when the vehicle is started. The following are some examples thereof:

(1) A speed at which a clutch is engaged when the vehicle is started (i.e., increase of torque thereby transmitted) is controlled in proportion to a variation rate in the rotational speed of the engine (differential value), as disclosed in Japanese Published Unexamined Patent Application No. 39821/1983;

(2) An energizing current transmitted as torque by a powder clutch is controlled as an exponential function of the rotational speed of the engine when the vehicle is started, as disclosed in Japanese Published Unexamined Patent Application No. 15024/1982; and (3) A clutch speed at which the control of a clutch is completed when the vehicle is started, that is, the rotational speed of the clutch at which the target engagement thereof is completed is set. Then, with the rotational speed at which the target engagement, of the clutch is completed, the torque transmitted from the clutch to a transmission is feed back controlled so that the clutch is actually engaged, as disclosed in Japanese Published Unexamined Application NO. 31532/1987.

These methods have their own advantages and make it possible to obtain satisfactory starting characteristics. However, it often that one as a feeling of physical disorder if he exchanges a vehicle equipped with a fluid coupling with one equipped with a clutch other than fluid coupling.

For example, one feels that the vehicle starts abruptly when the accelerator is operated or feel shocking when the vehicle is moved backward. This is because the characteristics of torque transmission by a fluid coupling which gives a feeling of a smooth sliding motion are slightly different from those characteristics obtained by the control methods as hereinabove stated at (1) to (3).

A driver who is used to the relatively rough operation of the accelerator which the fluid coupling permits has a feeling of physical disorder such as described above, if he drives the vehicle by operating the accelerator roughly with the same drive feeling as that in any type of vehicle in which the transmission of torque is controlled by any of the methods as hereinabove stated.

SUMMARY OF THE INVENTION

It is, therefore, an object of this invention to provide a method and an apparatus for controlling a clutch on a vehicle wherein a driver does not experience a feeling of physical disorder even if he exchanges a vehicle equipped with a fluid coupling as a clutch with the one equipped with a clutch other than fluid coupling.

It is another object of this invention to provide a method and an apparatus for controlling a clutch on a vehicle wherein transmission characteristics of clutch torque is easily determined in a vehicle equipped with various kinds of engines and transmissions.

These objects are attained by providing a clutch control apparatus for a vehicle comprising: a clutch connected, at an input side thereof, to an engine and having an actuator for changing a transmitting torque thereof; first detecting means for detecting speed Ne of said engine; second detecting means for detecting speed Nin of an input shaft of a transmission, said input shaft being connected to an output side of said clutch; means for inputting said speeds Ne and Nin and calculating a speed ratio $e = Nin/Ne$; means for detecting a transmission coefficient C fluid coupling capacity factor of from a predetermined relationship between said speed ratio e and said transmission coefficient C; and means for calculating a transmitting torque Tcl of said clutch using said transmission coefficient C and said engine speed Ne and outputting said torque Tcl to said actuator.

DETAILED DESCRIPTION OF THE PREFERRED EMBODIMENTS

Figure 1:
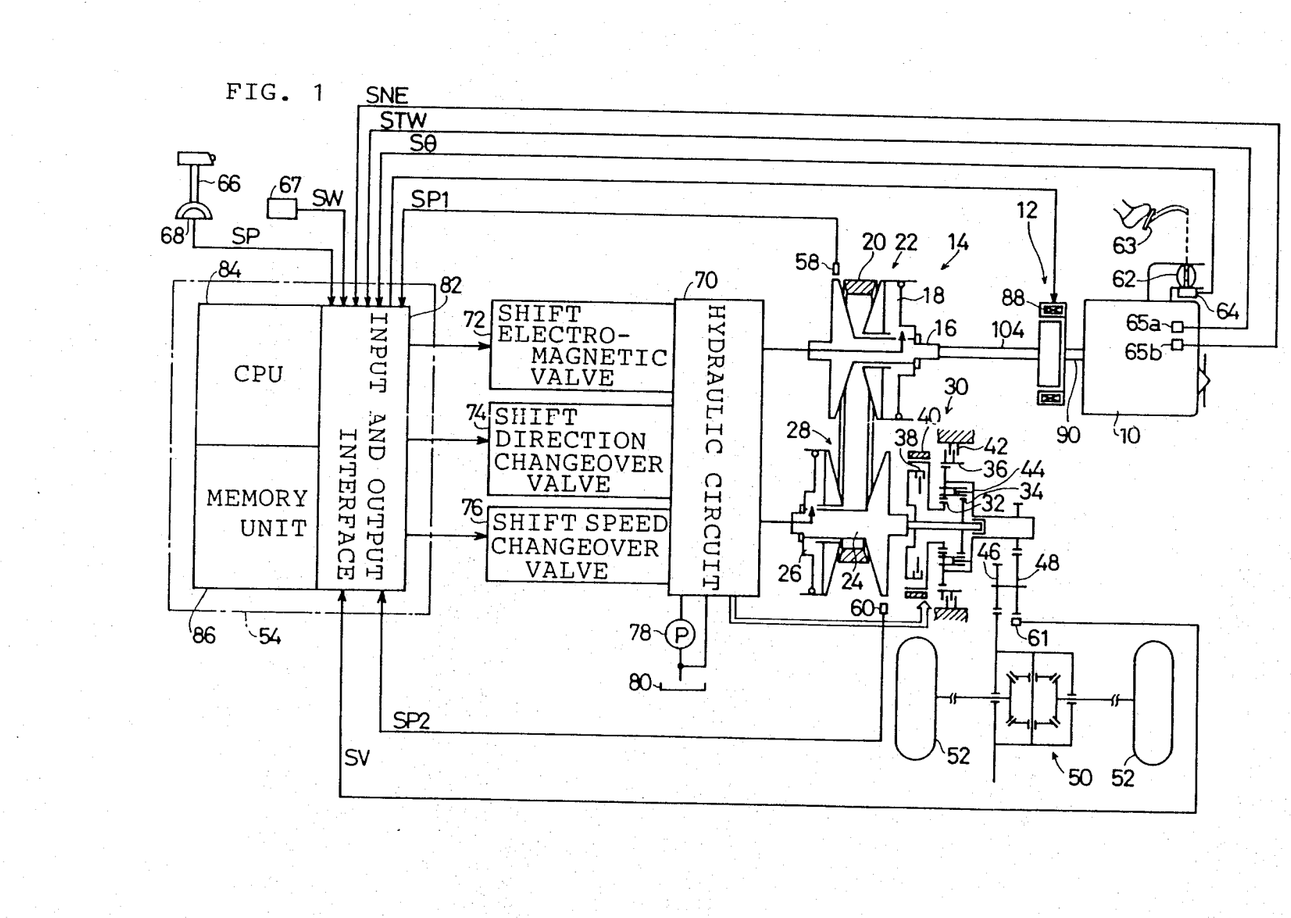
FIG. 1 is a diagram showing a total schematic illustration of a vehicle to which one embodiment of the present invention is applied.

The invention will now be described in further detail with reference to the drawings. Referring first to FIG. 1, an engine 10 on a vehicle is connected to an input shaft 16 of a continuously variable transmission 14 through a powder clutch 12, which will be described in detail with reference to FIG. 2.

The input shaft 16 is provided with a variable pulley 22 having a V groove, the width of which is variable by a hydraulic cylinder 18 so that a transmission belt 20 may have a variable diameter on the variable pulley 22. The continuously variable transmission 14 has an output shaft 24 provided with a variable pulley 28 having a V groove, the width of which is variable by a hydraulic cylinder 26.

The rotational torque received by the input shaft 16 is transmitted by the transmission belt 20 running across the variable pulleys 22 and 28 to the output shaft 24 and then to an auxiliary transmission 30. The auxiliary transmission 30 includes Ravignawx composite planetary gearing which comprises a first sun gear 32, a second sun gear 34 and a ring gear 36.

The speed change ratio Rf of the auxiliary transmission 30 or its FOR/REV direction rotation is changed, as shown in TABLE 1, when a high speed clutch 38, a low speed brake 40 or a reversing brake 42 is selectively operated by a hydraulic actuator not shown.

TABLE 1

| Range | High speed Clutch 38 | Low speed brake 40 | Reversing brake 42 | Speed change (reduction) ratio Rf of auxiliary transmission |
|---|---|---|---|---|
| Forward | | | | |
| Low speed | x | o | x | $(1 + 1/\rho 2)$ |
| High speed | o | x | x | 1 |
| N (neutral) | x | x | x | — |
| Backward | x | x | o | $-(1 - 1/\rho 2)$ |

In TABLE 1, ↑1 is Zs1/Zr and ↑2 is Zs2/Zr, where Zs1 stands for the number of teeth of the first sun gear 32, Zs2 stands for the number of teeth of the second sun gear 34 and Zr stands for the number of teeth of the ring gear 36.

The output shaft 24 of a belt-type continuously variable transmission constitutes an input shaft of the auxiliary transmission 30 and an output shaft thereof is formed by a carrier 44 supporting the planetary gears thereon. Therefore, the speed change ratio Rf (=1/speed ratio) of the auxiliary transmission 30 is equal to a value of the rotational speed of the output shaft 24 divided by the rotational speed of the carrier 44. The rotation of the carrier 44 is transmitted to a pair of driving wheels 52 of the vehicle through intermediate gears 46 and 48 and a final speed reducer 50.

An input shaft rpm sensor 58 for detecting the rotational speed of the input shaft 16 and an output rpm sensor 60 for detecting the rotational speed of the output shaft 2 are provided near the variable pulleys 22 and 28, respectively, for outputting to a controller 54 pulse signals SP1 and SP2 which have frequencies corresponding to the rotational speeds of the variable pulleys 22 and 28, respectively.

A vehicle speed sensor 61 is provided near the intermediate gear 48 for outputting to the controller 54 a pulse signal SV having a frequency corresponding to the rotational speed of the intermediate gear 48. A throttle valve 62 is provided in an intake duct for the engine 10 and is opened and closed by the operation of an accelerator pedal 63. The throttle valve 62 is provided with a throttle sensor 64 adapted to supply the controller 54 with a throttle signal S which indicates the opening degree $\theta$ of the throttle valve 62.

A cooling water temperature sensor 65a is provided in a water jacket for the engine 10 to supply the controller 54 with a water temperature signal STW which indicates the temperature Tw of cooling water. An engine speed sensor 65b is provided in an ignition circuit for the engine 10 to supply the controller 54 with an engine speed signal SNE which indicates the rotational speed Ne of the engine 10.

In this preferred embodiment, a shift lever 66 and a shift mode switch 67 are provided for setting a shifting mechanism. A shift position sensor 68 is provided for detecting the shift position Psh of the shift lever 66 and supplying the controller 54 with a signal SP indicating the above shift position, while the shift mode switch 67 supplies the controller 54 with a shift mode signal SW which indicates the shift mode W.

The shift lever 66 is mechanically associated with a manual valve in a hydraulic circuit 70, so that no hydraulic fluid may be supplied to any of the hydraulic actuators which respectively operate the high speed clutch 38, the low speed brake 40 and the reversing brake 42 when the shift lever 66 is in its neutral position and the hydraulic fluid is supplied to only the hydraulic actuator for the reversing brake 42 when it is in its backward position.

If the shift lever 66 is in its normal drive position (D: drive) the hydraulic fluid is supplied to only the hydraulic actuator for the high speed clutch 38 and a high speed gear train is maintained. If the shift lever 66 is in its automatic speed change position (S range) or its engine brake position (L range), the hydraulic fluid is supplied to either of the hydraulic actuators for the high speed clutch 38 and the low speed brake 40. The hydraulic actuators are selectively supplied with a hydraulic pressure from a shift valve which operates in response to the operation of a shift electromagnetic valve 72 provided in the hydraulic circuit 70.

The hydraulic circuit 70 supplies to the hydraulic cylinder 26 on the output shaft 24 with a hydraulic line pressure which is controlled in accordance with the actual speed change ratio (speed ratio $\gamma$) of the continuously variable transmission 14 and the output torque of the engine 10, such that the transmission belt 20 may be kept under appropriately controlled tension.

The hydraulic circuit 70 responds to the operation of a shift direction changeover valve 74 for supplying or discharging the hydraulic fluid to/from the hydraulic cylinder 18 on the input shaft 16 and also responds to the operation of a shift speed changeover valve 76 for changing the rate at which the hydraulic operating fluid is supplied to the hydraulic cylinder 18, or the rate at which the hydraulic operating fluid is discharged. A hydraulic pump 78 is driven by, for example, the engine 10 for supplying the hydraulic operating fluid under pressure from a fluid reservoir 80 to the hydraulic circuit 70 and thereby forms a source of fluid pressure for the hydraulic circuit 70.

The controller 54 comprises an input and output interface 82, a central processing unit 84 and a memory unit 86. The various types of input signals which have been inputted through the input and output interface 82 to the controller 54 are processed in accordance with the program and data which have been stored in the memory unit 86.

The results of such processing are utilized for controlling the operation of the shift electromagnetic valve 72 to cause the gear train in the auxiliary transmission 30 to shift automatically; for controlling the operation of the shift direction changeover valve 74 and the shift speed changeover valve 76 to change the speed change ratio (speed ratio $\gamma$) of the continuously variable transmission 14 to an optimum value; and for controlling the energization of the powder clutch 12 to control its engagement to an optimum level.

The powder clutch 12 is designed to transmit, according to certain transmission characteristics, a torque corresponding to the energized current which is supplied into a magnetized coil 88 to the continuously variable transmission 14 by filling magnetic powder with the magnetic force of the magnetized coil 88 in a gap between a rotor on the input side and a rotor on the output side.

Figure 2:
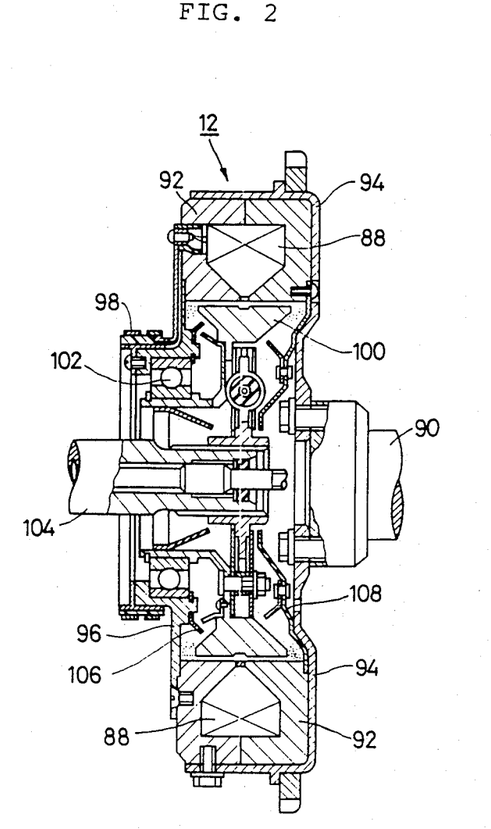
FIG. 2 is an illustration showing the total construction of the powder clutch according to the preferred embodiment of the present invention.

The detailed construction of the powder clutch 12 is shown by way of example in FIG. 2. It has an input shaft 90 to which an annular yoke 92 defining the rotor on its input side is secured via an outer circumferential member 94. The magnetized coil 88 is annularly embedded in the annular yoke 92. An energizing current is supplied to the magnetized coil 88 through a slip ring 98 secured to a first labyrinth member 96 which is rotatable with the annular yoke 92.

A rotor 100, which is the rotor on the output side, is supported on the first labyrinth member 96 by a bearing 102 so that the annular yoke 92 and the rotor 100 can be concentric to each other and are rotatable relative to each other. The rotor 100 is connected with spline to the end of an output shaft 104. The first labyrinth member 96 has an annular projection 106. A second labyrinth member 108 has a similar annular projection and is secured to the annular yoke 92 near the input shaft 90. The annular projection 106 and the second labyrinth member 108 define a substantially closed annular space which can hold magnetic powder therein.

The magnetic powder in the annular space is attracted by the magnetic force of the magnetized coil 88 to fill a gap between the inner peripheral surface of the annular yoke 92 and the outer peripheral surface of the rotor 100. The powder is magnetically bound to transmit the rotation of the input shaft 90 to the output shaft 104 by an amount of torque proportional to the energizing current supplied to the magnetized coil 88. The input and output shafts 90 and 104 are, therefore, the input and output shafts, respectively, of the powder clutch 12.

Figure 3:
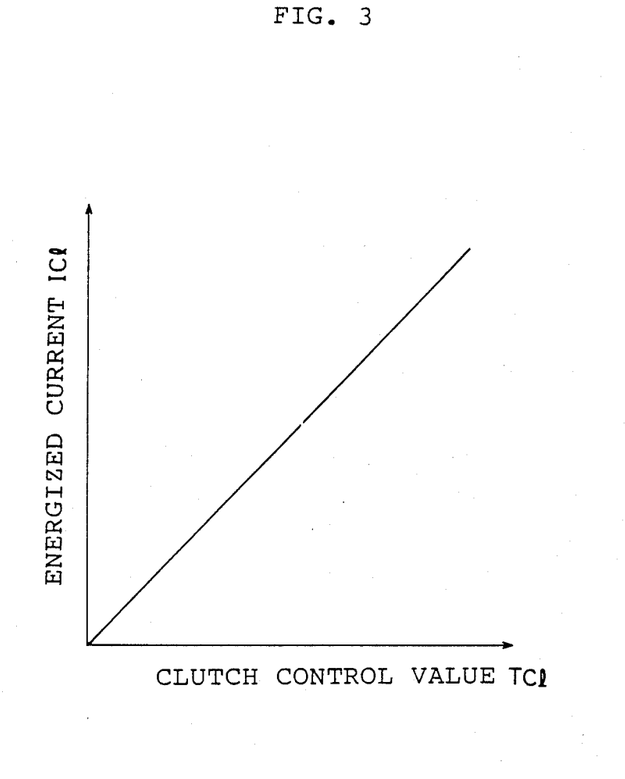
FIG. 3 is a graph showing the control characteristics of the powder clutch according to the present embodiment of the present invention.

The rate of power transmission by the powder clutch 12 is proportional to the energizing current Icl supplied to the magnetized coil 88. FIG. 3 is a graph showing the relation between the energizing current Icl flowing to the magnetized coil 88 of the powder clutch 12 and the clutch control value Tcl corresponding to the torque which is actually transmitted from the powder clutch 12.

Figure 4:
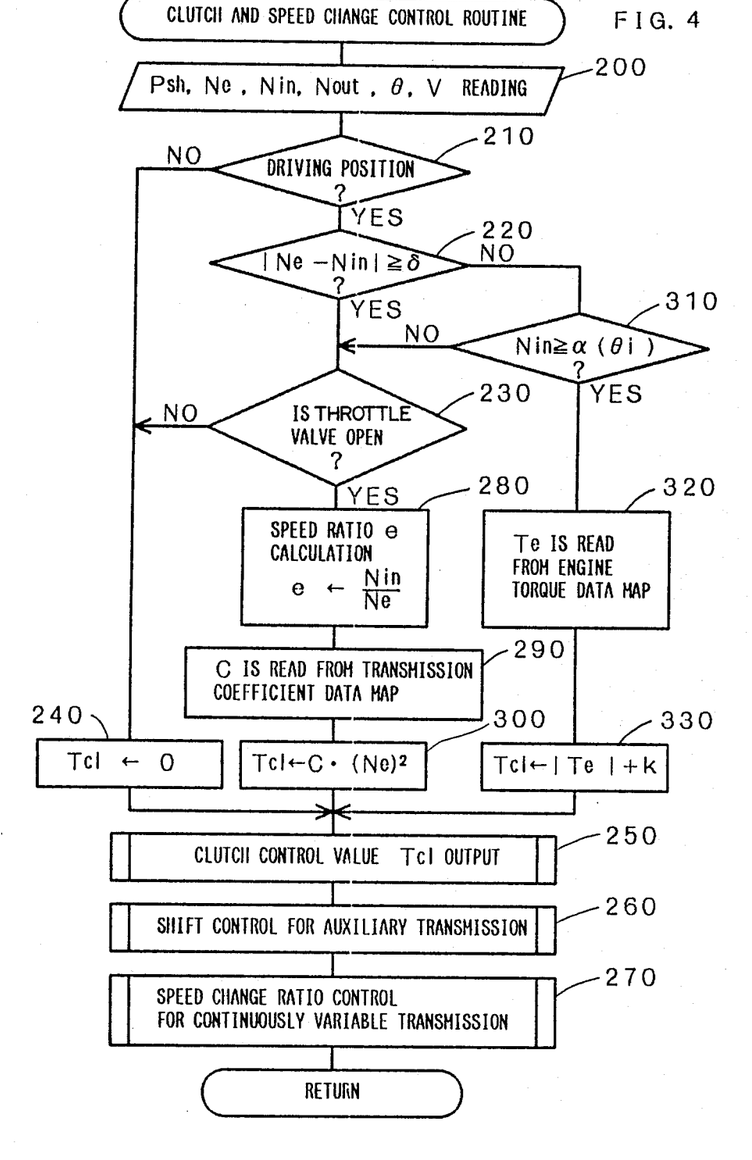
FIG. 4 is a flow chart showing a routine of the clutch and transmission control according to a first embodiment.

Reference is now made to FIG. 4. It is a flow chart showing a routine of clutch and transmission control according to a first embodiment of this invention. If the routine is called, the position Psh of the shift lever 66, the rotational speed Ne of the engine, the rotational speed Nin of the input shaft 16, the rotational speed Nout of the output shaft 24, the throttle opening $\theta$ and the vehicle speed V based on the rotational speed of the intermediate gear 48 are read in accordance with the signals SP, SNE, SP1, SP2, S$\theta$ and SV (Step 200) respectively.

Then, judgment is made as to whether the shift lever 66 is in its driving position (other than its neutral or parking position) (Step 210). If the result of the judgment is yes, judgment is, then, made as to whether the difference, $|N_e - N_{in}|$, between the rotational speed Ne of the engine and the rotational speed $N_{in}$ of the input shaft 16 is at least equal to a predetermined value $\delta$ (50 rpm, for example) (step 220). If the difference of rpm $|N_e - N_{in}|$ is judged more than the predetermined value $\delta$, i.e., result of the judgment is yes, i.e., if the powder clutch 12 is slipping, judgment is made as to whether the throttle valve 62 is open (i.e., throttle opening degree $\theta$ is not "0") (Step 230). If the throttle valve 62 is closed (i.e., throttle opening degree $\theta$ is "0"), the clutch control value Tcl is set at "0" (Step 240).

After the clutch control value $T_{cl}$ has been set, the energizing voltage $V_{cl}$ (proportional to energizing current $I_{cl}$) corresponding to the clutch control value $T_{cl}$ is outputted from the controller 54 to the powder clutch 12 (Step 250), whereby the energizing current becomes "0" and the torque which is transmitted by the powder clutch 12 is actually controlled to "0". Then, the shift control of the auxiliary transmission 30 is effected by a routine not shown (Step 260). Then, the target rotational speed $N_{in}^*$ of the input shaft 16 of the continuously variable transmission 14 is calculated from the throttle opening $\theta$ and the vehicle speed V in accordance with a routine not shown and the shift direction changeover valve 74 and the shift speed changeover valve 76 are controlled to control the speed change ratio of the continuously variable transmission 14 (Step 270).

If the throttle valve 62 is not fully closed as a result of the actuation of the accelerator pedal when the vehicle is at a stop or is idling (Step 230), the speed ratio e of the powder clutch 12 is calculated in accordance with formula (1) (Step 280):

$$e = N_{in}/N_e \quad (1)$$

where Nin is the rotational speed of the input shaft 16 of the continuously variable transmission 14 and Ne is the rotational speed of the engine 10.

Figure 5:
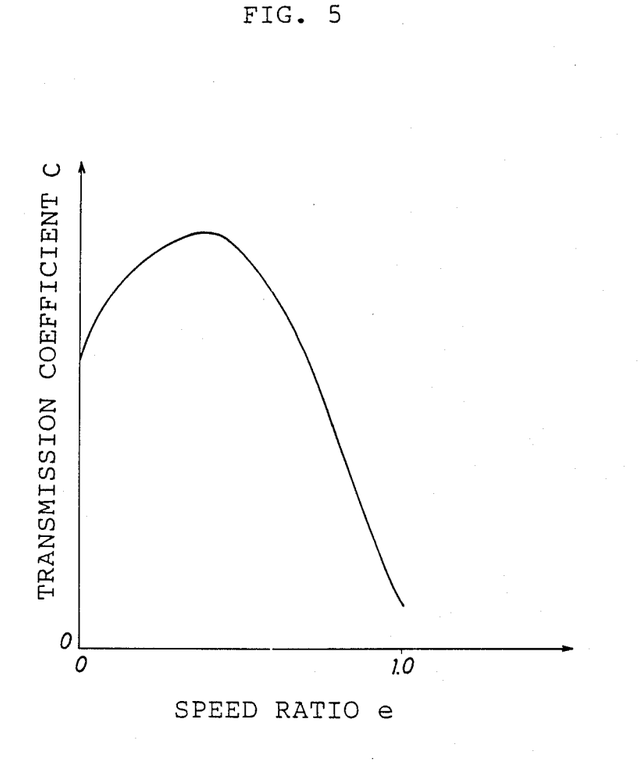
FIG. 5 is a graph showing the transmission coefficient as obtained by the first embodiment of the present invention.

Then, the transmission coefficient C as a function of the speed ratio is read from the data map shown in FIG. 5 (Step 290) and the clutch control value $T_{cl}$ representing the torque to be transmitted is calculated in accordance with formula (2) (Step 300):

$$T_{cl} = C \cdot (N_e)^2 \quad (2)$$

where $T_{cl}$ is the clutch control value and C is the transmission coefficient.

Formula (2) is based on the practical formula (2)' which has been established from experimental data:

$$\text{Torque transmitted} = \gamma O \cdot C \cdot (N_e)^2 \quad (2)'$$

where $\gamma O$ is the torque ratio in the fluid coupling, that is, a ratio of turbine torque/pump torque ("1" in the case of a fluid coupling).

The data map for the transmission coefficient C to which reference is made for the calculation made according to formula (2) represents the results of the calculation made according to formula (2)' from the torque transmission characteristics, etc. of an actual fluid coupling and is in advance stored in the memory unit 86 of the controller 54.

After the clutch control value Tcl has been calculated, Steps 250 to 270 are carried out for controlling the torque transmission of the powder clutch 12, the shift of the auxiliary transmission 30 and the speed change ratio of the continuously variable transmission 14.

As a result of Steps 200 to 230 and 250 to 300, the torque which is transmitted by the powder clutch 12 is controlled to the value calculated from the transmission coefficient C (shown as a function of the speed ratio e in FIG. 5) and the square of the rotational speed $N_e$ of the engine in accordance with formula (2) and the vehicle is started.

When the slipping of the powder clutch 12 has been reduced to less than the predetermined value with an increase of the vehicle speed V, i.e., if it has been found from Step 220 that the difference, $N_e - N_{in}$, is smaller than $\delta$, judgment is made as to whether the rotational speed $N_{in}$ of the input shaft 16 is at least equal to a predetermined value $\alpha$ (1000 rpm, for example) (Step 310). If the result of the judgment is yes, an engine torque data map not shown is selected from among the data maps stored in the memory unit 86 and the present engine torque $T_e$ corresponding to the rotational speed $N_e$ of the engine and the throttle opening $\theta$ is read from the selected data map (Step 320).

It is alternatively possible to detect the engine torque $T_e$ by means of a torque sensor attached to the engine 10 such as a strain gauge.

Then, the clutch control value Tcl representing the torque to be transmitted is calculated according to a formula (3) (Step 330):

$$T_{cl} = |T_e| + k \quad (3)$$

where $|T_e|$ is the absolute value of the engine torque and k is an allowance for torque (1 to 2 kg.m. for example). After calculation of clutch control value $T_{cl}$, steps 250 to 270 are, then, repeated for controlling the torque which is transmitted by the powder clutch 12, the shift of the auxiliary transmission 30 and the speed change ratio of the continuously variable transmission 14.

As a result of Steps 200 to 230, 250 to 270 and 310 to 330, the torque which is transmitted by the powder clutch 12 to the continuously variable transmission 14 is controlled to the value of the engine torque $T_e$ plus the allowance k according to formula (3) and the powder clutch 12 is directly engaged (i.e., locked up).

If the throttle opening degree $\theta$ is changed to "0" when the powder clutch 12 is in its directly connected position, the speed change ratio $\gamma$ of the continuously variable transmission 14 gradually increases to a maximum speed change ratio $\gamma$ max with a gradual reduction of the vehicle speed V. If it has been found from Step 310 after a further reduction of the vehicle speed V that $N_{in}$ is less than $\alpha(\theta i)$, i.e., if the rotational speed $N_{in}$ of the input shaft 16 is less than the rotational speed $\alpha(\theta i)$ which is smaller by a certain value than the target rotational speed $N_{in}$ * (stall speed) corresponding to the maximum speed change ratio $\gamma_{max}$ of the continuously variable transmission 14, judgment is made as to whether the throttle valve 62 is open (Step 230) and the clutch control value $T_{cl}$ is set at "0" (Step 240).

As a result, the torque which is transmitted by the powder clutch 12 to the continuously variable transmission 14 is reduced to "0" and the vehicle coasts until it eventually stops. As shown in the clutch and speed change control routine, when the vehicle is at a stop or is coasting, therefore, the powder clutch 12 is completely disengaged and the engine 10 is in its idling position without any load connected thereto. As a result, the rotation of the engine 10 is stabilized and any creep phenomena of the powder clutch 12 and unnecessary fuel consumption can be prevented.

When the vehicle is started, or is accelerated again after coasting, the torque which is transmitted by the powder clutch 12 to the continuously variable transmission 14 is controlled to the value $(T_{cl}=C.(N_e)^2)$ which follows the torque transmission characteristics of an actual fluid coupling. Therefore, the driver of the vehicle who is used to driving a vehicle equipped with a fluid coupling has no feeling of physical disorder at all when starting it. Moreover, it is possible to obtain the desired torque transmission coefficient C. Therefore, the clutch control system is simple in design and is easily applicable to other types of engines, transmissions, etc. The driver will have an even better feeling when driving the vehicle if it is provided with a switch for selecting the transmission coefficient C or a device for establishing a pattern for the transmission coefficient C to enable him to select or set the desired torque transmission characteristics.

When the above vehicle speed control is completed and the powder clutch 12 is locked up, the torque which is transmitted by the powder clutch 12 to the continuously variable transmission 14 is equal to the engine torque plus the allowance. Consequently, the powder clutch 12 can absorb any excessive torque resulting, for example, from any sudden change of the load on the vehicle. In other words, the powder clutch 12 acts as a torque limiter on any such occasion and prevents any unduly large torque from acting upon the transmissions and other components of the power transmission, so that their durability may be improved.

Figure 6:
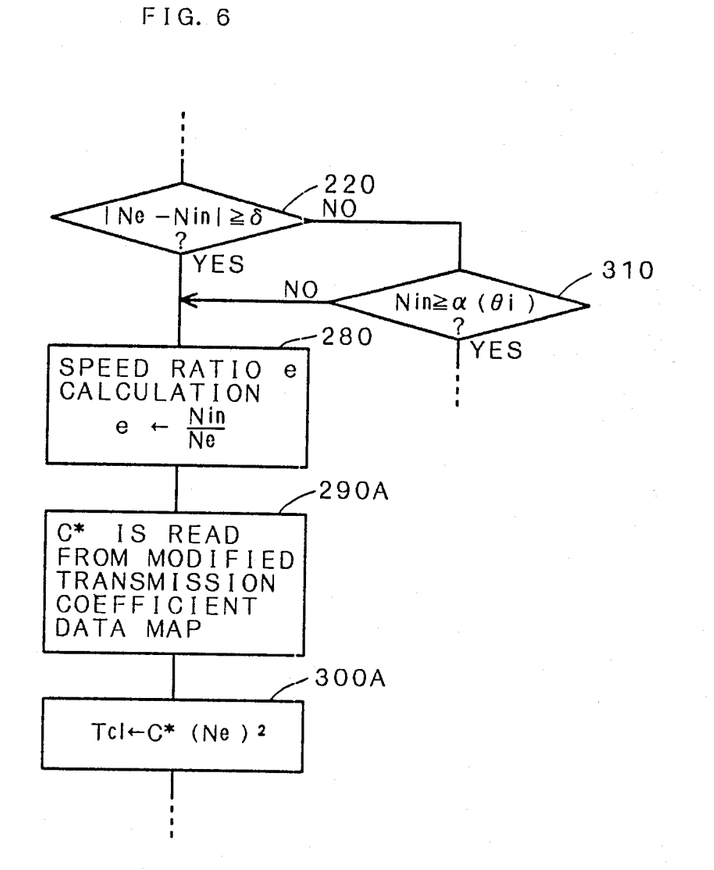
FIG. 6 is a flow chart showing partly a routine of clutch and transmission control according to a second preferred embodiment of the present invention.

Attention is now directed to FIG. 6 showing a routine of control according to a second embodiment of this invention. It is substantially identical to the routine of FIG. 4 according to the first embodiment, but differs therefrom in that it does not include Step 230 of the routine in FIG. 4 (judgment as to whether the throttle valve is open), but directly proceeds to the control of the torque which is transmitted by the powder clutch 12 to the continuously variable transmission 14 when the vehicle is started (Steps 280, 290A and 300A).

In this embodiment, judging from sliding degree in the step 220 or stall revolution of the continuously variable transmission 14 in the step 310, the speed ratio e is computed directly from the formula (1) (step 280) without judging the opening degree of the throttle, fully closed or not, in step 230.

Figure 7:
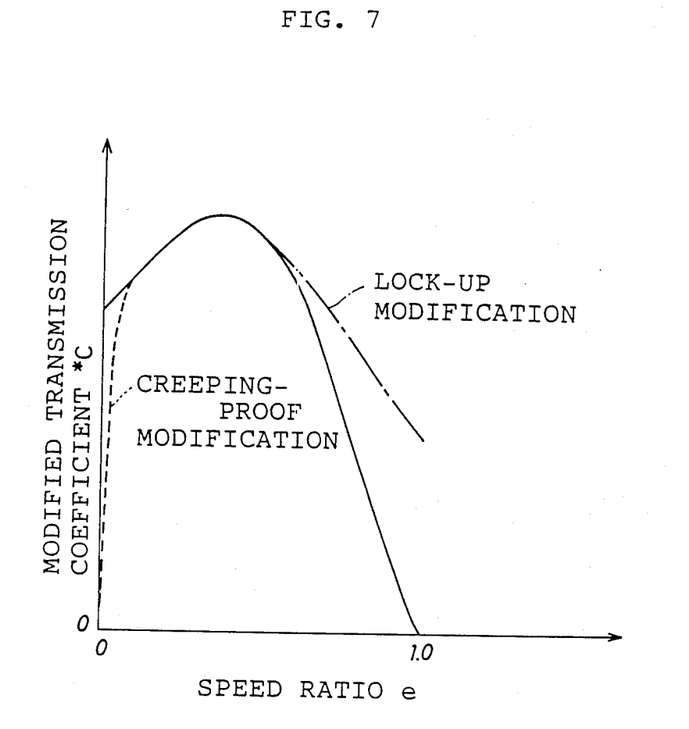
FIG. 7 is a graph showing the characteristics of modified transmission coefficient as obtained by the second preferred embodiment.

Then, a modified transmission coefficient C* is read from the data map shown in FIG. 7 (Step 290 A). The coefficient C. is obtained by modifying the transmission coefficient taking the reduction of creep phenomena and the lockup condition of the clutch into consideration. Then, the clutch control value $T_{cl}$ representing the torque to be transmitted when the vehicle is started is calculated according to a formula (4) (Step 300A):

$$T_{cl} = C^* \cdot (N_e)^2 \quad (4)$$

Where C* is the modified transmission coefficient.

As a result, the torque which is transmitted by the powder clutch 12 to the continuously variable transmission 14 when the vehicle is started is actually controlled by the modified transmission coefficient C. as shown in FIG. 7, etc.

The advantages resulting from the use of the modified transmission coefficient C shown in FIG. 7 will now be set forth, as compared with the transmission coefficient of an ordinary fluid coupling which is shown by a solid line in FIG. 7:

(1) The interruption of transmitting torque can be controlled as desired if the transmission coefficient C* is appropriately adjusted when the speed ratio e is close to "0", i.e., when the vehicle is at a stop. Therefore, it is possible to reduce any creep phenomena of the clutch when the vehicle is at a stop, by setting the coefficient C* smaller than that of ordinary fluid coupling when the speed ratio e is near "0", as shown by a broken line in FIG. 7.

(2) The feeling as to the slipping of the clutch can be controlled as desired if the coefficient C* is appropriately adjusted when the speed ratio e is close to "1", i.e., when the clutch has a slight slippage. Therefore, it is possible to reduce the feeling of clutch slippage if the coefficient C* is increased when the speed ratio e is in the vicinity of "1", as shown by a one-dot chain line in FIG. 7.

The routine according to the second embodiment of this invention makes it possible to modify and improve the torque transmission characteristics of a fluid coupling. Therefore, it can maintain the slipping of the clutch at an optimum level as well as improving driving comfort of the vehicle, thus giving improved driving performance.

This invention, is not necessarily limited to these embodiments but can be applied to other types of vehicle clutches if it is capable of externally controlling a transmitting torque without deviating from the scope of the present invention.

Therefore, it is also applicable to, for example, a hydraulically controlled wet clutch or a dry clutch provided with an actuator for controlling a pushing force, too. Moreover, it is possible to employ a different data map showing the transmission coefficient, a different exponent for the engine rotational speed $N_e$ in formula (2), etc. which does not depart from the scope of this invention.

What is claimed is:

1. A clutch control apparatus for a vehicle comprising:
    a clutch connected, at an input side thereof, to an engine and having an actuator for changing a transmitting torque thereof;
    first detecting means for detecting speed Ne of said engine;
    second detecting means for detecting speed $N_{in}$ of an input shaft of a transmission, said input shaft being connected to the output side of said clutch;
    means for calculating a speed ratio $e = N_{in}/Ne$ from said speeds Ne and $N_{in}$;
    means for determining a fluid coupling capacity factor C of said clutch from a predetermined relationship between said speed ratio e and said fluid coupling capacity factor C; and
    means for calculating a transmitting torque Tcl of said clutch using said fluid coupling capacity factor C and said engine speed Ne and outputting said torque Tcl of said actuator.

2. A clutch control apparatus for a vehicle as claimed in claim 1, wherein said clutch is a powder clutch.

3. A clutch control apparatus for a vehicle as claimed in claim 2, wherein said powder clutch is connected, at an output side thereof, to a continuously variable transmission.

4. A clutch control apparatus for a vehicle as claimed in claim 3, wherein said continuously variable transmission is operated by a shift direction change valve and shift speed change valve which are controlled by a controller.

5. A clutch control method for a vehicle comprising steps of:
    detecting a speed Ne of an engine, said engine being connected to an input side of a clutch;
    detecting a speed $N_{in}$ of an input shaft of a transmission, said input shaft being connected to an output side of said clutch;
    calculating a speed ratio $e = N_{in}/Ne$ from said detected speed Ne and Nin ;
    determining a fluid coupling capacity factor C of said clutch from a predetermined relationship between said fluid coupling capacitor factor C and said speed ratio $e = N_{in}/Ne$;
    calculating a transmitting torque Tcl of said clutch using said fluid coupling capacity factor C and engine speed Ne; and
    outputting said transmitting torque Tcl to said clutch for changing transmitting torque thereof.

6. A clutch control method for a vehicle as claimed in claim 5, wherein said output torque of said clutch is equal to $C \cdot (N_e)^2$.

* * * * *